Dec. 19, 1961  G. G. HASELDEN  3,013,781
FRACTIONATING APPARATUS
Filed March 10, 1958  2 Sheets-Sheet 1
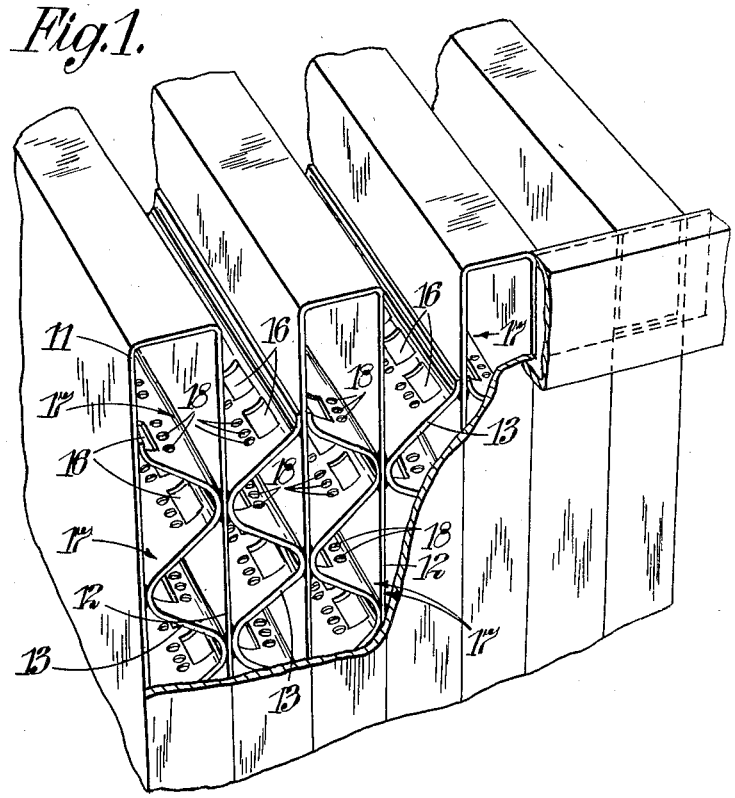
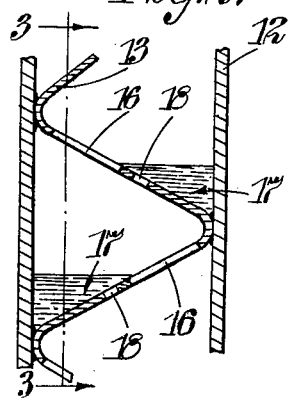
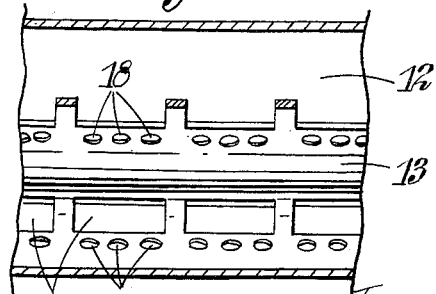
Inventor
Geoffrey G. Haselden
By
Watson, Cole, Grindle & Watson
Attorneys

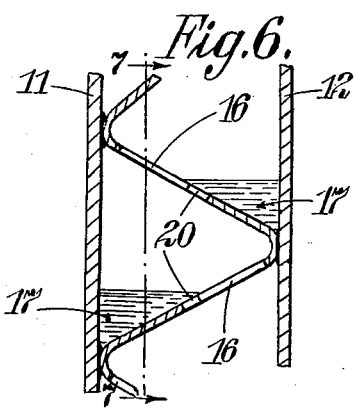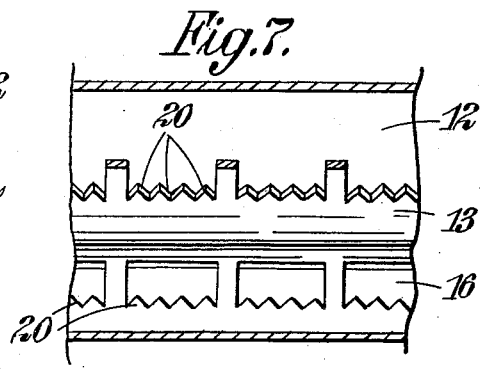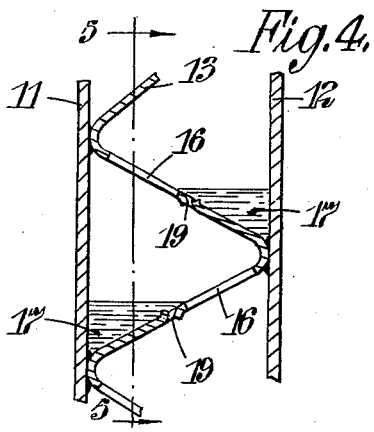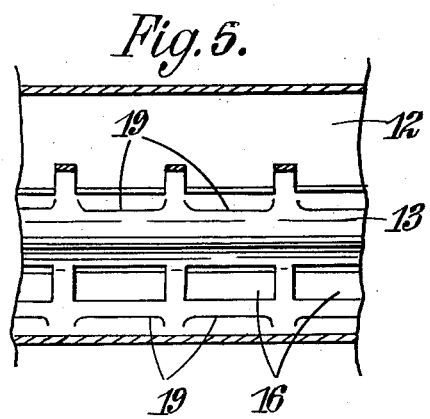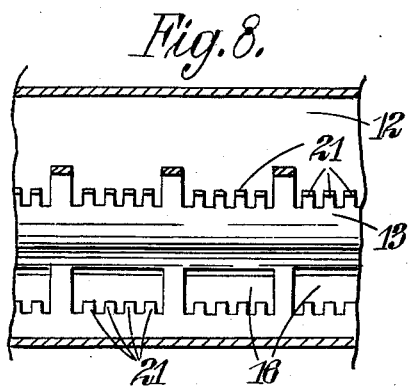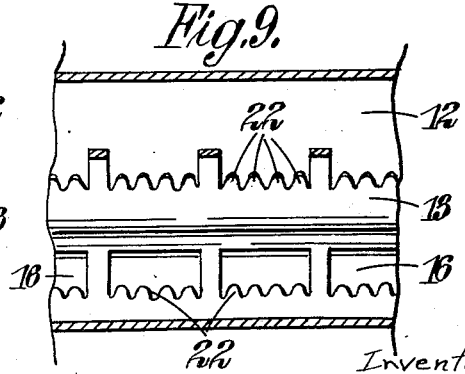

United States Patent Office 3,013,781
Patented Dec. 19, 1961

3,013,781
FRACTIONATING APPARATUS
Geoffrey Gordon Haselden, 50 Richmond Road,
West Wimbledon, London, England
Filed Mar. 10, 1958, Ser. No. 720,369
Claims priority, application Great Britain Mar. 15, 1957
3 Claims. (Cl. 261—112)

This invention relates to fractionating apparatus, and is an improvement in or modification of the invention which is the subject of United States patent application Serial No. 539,602, now U.S. Patent No. 2,885,195. Patent application Serial No. 539,602 is concerned with fractionating apparatus designed primarily for use in the treatment of mixed gases such as are met with in the manufacture of oxygen by distillation of liquid air, but the apparatus is capable of many other applications. It is an object of this invention to improve the separating performance of such fractionating apparatus.

In application Serial No. 539,602 there is described and claimed a fractionating column comprising a wall or walls (which need not be straight but can be of curved configuration), and a series of superposed partitions within said wall or walls, each succeeding partition extending both upwardly and across the column and being sloped in a different direction to the partition preceding it, and wherein each partition has at least one vapour-flow aperture through its upper portion permitting the sinuous upward flow of gas through the column, the part of the partition below said vapour-flow aperture constituting the wall of a liquid-collecting pocket or trough from which liquid flows over the top edge of said pocket or trough wall through the lower portion of said vapour-flow aperture and runs down the underface of the partition as a thin film, on which the gas issuing upwards in a state of turbulent flow from the vapour-flow aperture or apertures in the partition below impinges.

According to the present invention, there is provided a fractionating column or apparatus as claimed in any one of the claims of application Serial No. 539,602, wherein the partitions are provided, at or just below the lower edges of at least some of the vapour-flow apertures, with subsidiary openings adapted to permit local increases in the liquid flow from the pockets or troughs down the partitions.

In one embodiment of the invention, one or more narrow slots or a row of fine holes is provided in the wall of each pocket or trough just below the lower edge or edges of the vapour-flow aperture or apertures. Each slot or row of holes may be substantially parallel to the lower edge or edges of the respective vapour-flow aperture or apertures, and situated not more than 1/16 inch down the wall from said lower edge or edges. Preferably, the width of the slots or holes, in the direction down the wall, is less than 1/16 inch.

In another embodiment, the subsidiary openings are provided by notches or serrations in the lower edges of the vapour-flow apertures. Preferably, the notches or serrations are of saw-tooth, castellated or wave form, and are between 1/64 inch and 1/8 inch in depth.

Various specific constructions, given by way of example, will now be described, in each of which the invention is applied to a multiple unit fractionating apparatus, generally similar to that shown in FIGURE 1 of application Serial No. 539,602. Reference will be made to the accompanying drawings, in which:

FIGURE 1 is a perspective view, part broken away, of a multiple unit fractionating apparatus employing one construction of spacer element;

FIGURE 2 shows a spacer element of FIGURE 1 in enlarged transverse vertical section;

FIGURE 3 is a section on the line 3—3 of FIGURE 2;

FIGURE 4 shows another construction of spacer element in transverse vertical section;

FIGURE 5 is a section on the line 5—5 of FIGURE 4;

FIGURE 6 shows a further construction of spacer element in transverse vertical section;

FIGURE 7 is a section on the line 7—7 of FIGURE 6; and

FIGURES 8 and 9 are views similar to FIGURE 7 illustrating modified constructions of vapour-flow aperture.

The fractionating apparatus to be described has a series of parallel vertical metal walls 11, 12 separated by horizontal corrugated metal spacer elements 13 which are united to the walls where they touch them at the bends or apices of the corrugations. Each section of each corrugated spacer element between consecutive bends in the element constitutes one of the aforementioned partitions, and just below every apex or bend each spacer element is provided with a horizontal row of rectangular vapour-flow apertures 16, each of which apertures may be, say, 1/4 inch long. The effect is to form a horizontal pocket or trough 17 below each row of apertures 16, in the angle between the spacer element 13 and one or other of the walls 11, 12, as the case may be, where liquid can collect and whence overflowing, it can creep through the apertures 16 and run as a thin film down the underside of the corrugation.

However, in the embodiment shown in FIGURES 1 to 3, the construction of each corrugated metal spacer element 13 is modified by forming (e.g. by stamping out) a row of fine holes 18 of circular cross-section in the element just below each of the rows of rectangular vapour-flow apertures 16. The distance of the holes 18 from the lower edges of the vapour-flow apertures is not more than 1/16 of an inch, and the diameter of the holes themselves is not more than 1/16 of an inch.

Instead of employing fine holes, a row of narrow slots may be formed in the element just below each of the rows of rectangular vapour-flow apertures. These slots may be formed either by stamping out or otherwise removing pieces of metal, or by making slits in the walls of the pockets or troughs and bending one or both edges of each slit out of the plane of the partition.

FIGURES 4 and 5 illustrate a construction in which slots 19, produced by forming slits in the partitions substantially parallel to the lower edges of the respective vapour-flow apertures and bending the lower edge of each slit upwardly, and the upper edge of each slip downwardly, are provided in the walls of the pockets or troughs. Each row of slots is disposed parallel to the lower edges of the vapour-flow apertures 16 in the respective row of said apertures above, being spaced not more than 1/16 inch down the face of the element from said lower edges. The width of each slot, considered in the direction down the face of the element, is not more than 1/16 inch.

By providing subsidiary openings 18 or 19 in the walls of the pockets or throughs 17, as described in these examples, the liquid flow is facilitated, and increased vapour and liquid flow rates are possible. Moreover, the mixing which occurs as additional liquid is injected directly from the pockets or troughs into the film draining down the undersides of the partitions, results in improved mass transfer.

In the construction of spacer element shown in FIGURES 6 and 7, instead of the lower edges of the vapour-flow apertures 16 being straight, as shown in FIGURE 1 of application Serial No. 539,602, they are uniformly serrated or notched. The serrations or notches 20 are of saw-tooth form, and the lower edge of each aperture 16 can be provided with any number of serrations or notches, preferably from two to six. The depth of each serration 20 is of the order of 1/64 to 1/8 of an inch.

Alternatively the serrations or notches can be of castellated or wave form, or of any other configuration suitable. Thus FIGURE 8 illustrates a construction of vapour-flow aperture 16 having a castellated lower edge 21, while FIGURE 9 shows a form of vapour-flow aperture 16 having a lower edge 22 of sinusoidal wave form. The depth of each castellated or wave form serration or notch is of the order of 1/64 to 1/8 of an inch, and the lower edge of each aperture 16 can be provided with any number of serrations or notches, preferably from two to six.

By making the lower edges of the apertures 16 irregular, as described in these examples, and thereby increasing the length of weir over which liquid from the pockets or troughs 17 can flow, increased vapour and liquid flow rates are possible. Moreover, these flow rates are also increased because the liquid draining at the base of the serrations or the like is less subject to the drag of the vapour, since the exposed area of this liquid is smaller.

A further advantage of these constructions is that turbulence is induced in the liquid film draining down the undersides of the partitions, and this results in improved heat and mass transfer.

The forms of apparatus described in this specification are suitable for use in connection with the treatment of air for the separation of oxygen and nitrogen by liquefaction and fractionation, as described for example in application Serial No. 468,110, now U. S. Patent No. 2,861,432.

I claim:

1. A fractionating column comprising an upright container, at least one series of vertically superposed partitions of fluid impervious material arranged within said container, each partition of the series of partitions extending both upwardly and across the column, being sloped in a different direction to the partition preceding it, and having at least one flow aperture through its upper portion for the upward flow of gas and the downward flow of liquid through the column, and each partition further having as subsidiary openings for the downward flow of additional liquid through the column, slots or holes therein positioned immediately adjacent the lower edges of the fluid flow apertures in the partition and spaced upwardly from the lower margin of the partition, whereby the liquid flows through the column as a film having localized areas of increased thickness compared to the normal thickness thereof at least some of said slots or holes being in the form of elongated slits extending parallel to the lower edge of the corresponding flow apertures, the marginal portion of the partition adjacent at least one side of each slit being deformed out of the plane of the partition.

2. A fractionating column as claimed in claim 1, in which the marginal portion of the partition above the slit is deformed downwardly from the plane of the partition and the marginal portion of the partition below the slit is deformed upwardly from the plane of the partition.

3. A fractionating column as claimed in claim 1, in which each of said subsidiary openings is of substantially smaller area than said fluid flow aperture.

References Cited in the file of this patent

UNITED STATES PATENTS

| | | |
|---|---|---|
| 899,063 | Mueller | Sept. 22, 1908 |
| 1,010,044 | Grace | Nov. 28, 1911 |
| 1,169,764 | Brassert | Feb. 1, 1916 |
| 1,782,735 | MacKenzie | Nov. 25, 1930 |
| 2,117,033 | Lyons | May 10, 1938 |
| 2,139,827 | Johnstone et al. | Dec. 13, 1938 |
| 2,645,607 | Allen | July 14, 1953 |
| 2,681,269 | Bergstrom | June 15, 1954 |
| 2,805,845 | Berry | Sept. 10, 1957 |
| 2,885,195 | Haselden | May 5, 1959 |

FOREIGN PATENTS

| | | |
|---|---|---|
| 668,293 | Great Britain | Mar. 12, 1952 |
| 680,457 | Great Britain | Oct. 8, 1952 |
| 684,870 | Germany | Dec. 7, 1939 |
| 721,243 | Great Britain | Jan. 5, 1955 |